(12) United States Patent
Fushiwaki et al.

(10) Patent No.: US 9,534,270 B2
(45) Date of Patent: *Jan. 3, 2017

(54) HIGH STRENGTH STEEL SHEET AND METHOD FOR MANUFACTURING THE SAME

(75) Inventors: Yusuke Fushiwaki, Fukuyama (JP); Yoshitsugu Suzuki, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 13/822,832

(22) PCT Filed: Sep. 30, 2010

(86) PCT No.: PCT/JP2010/067611
§ 371 (c)(1),
(2), (4) Date: May 29, 2013

(87) PCT Pub. No.: WO2012/042676
PCT Pub. Date: Apr. 5, 2012

(65) Prior Publication Data
US 2013/0306203 A1 Nov. 21, 2013

(51) Int. Cl.
*C21D 8/02* (2006.01)
*C21D 9/46* (2006.01)
*C21D 9/56* (2006.01)
*C22C 38/02* (2006.01)
*C22C 38/04* (2006.01)
*C22C 38/06* (2006.01)
*C23C 8/14* (2006.01)
*C23F 17/00* (2006.01)
*C21D 1/76* (2006.01)
*C09D 5/44* (2006.01)

(52) U.S. Cl.
CPC .............. *C21D 8/0247* (2013.01); *C21D 9/46* (2013.01); *C21D 9/561* (2013.01); *C22C 38/02* (2013.01); *C22C 38/04* (2013.01); *C22C 38/06* (2013.01); *C23C 8/14* (2013.01); *C23F 17/00* (2013.01); *C09D 5/4488* (2013.01); *C21D 1/76* (2013.01)

(58) Field of Classification Search
CPC ........... C21D 8/0247; C21D 1/76; C21D 9/46; C21D 9/561; C09D 5/4488; C22C 38/02; C22C 38/04; C22C 38/06; C23C 8/14; C23F 17/00
See application file for complete search history.

(56) References Cited

U.S. PATENT DOCUMENTS

| | | | |
|---|---|---|---|
| 6,063,451 A | 5/2000 | Murata | |
| 8,241,557 B2 | 8/2012 | Sugiyama | |
| 2003/0047255 A1 | 3/2003 | Delaunay | |
| 2004/0234807 A1 | 11/2004 | Suzuki | |
| 2005/0139293 A1 | 6/2005 | Nomura | |
| 2009/0053096 A1 | 2/2009 | Miura | |
| 2009/0123651 A1* | 5/2009 | Okada | C23C 2/28 427/319 |
| 2009/0308498 A1* | 12/2009 | Matsumura et al. | 148/284 |
| 2013/0174946 A1 | 7/2013 | Fushiwaki | |
| 2013/0306203 A1 | 11/2013 | Fushiwaki | |

FOREIGN PATENT DOCUMENTS

| | | |
|---|---|---|
| CA | 2810989 | 4/2012 |
| EP | 1482066 | 12/2004 |
| EP | 1548142 | 6/2005 |
| EP | 1865085 | 12/2007 |
| EP | 2103715 | 9/2009 |
| EP | 2381004 | 10/2011 |
| EP | 2518181 | 10/2012 |
| EP | 2623618 | 8/2013 |
| EP | 2623630 | 8/2013 |
| JP | 55-145122 A | 11/1980 |
| JP | 627890 | 1/1987 |
| JP | 5320952 A | 12/1993 |
| JP | 6010096 A | 1/1994 |
| JP | 7157891 | 6/1995 |
| JP | 07316762 | 12/1995 |
| JP | 09-019775 | 1/1997 |
| JP | 10-110300 A | 4/1998 |
| JP | 2003-113441 A | 4/2003 |
| JP | 2004-323969 A | 11/2004 |
| JP | 2006-045615 A | 2/2006 |
| JP | 2006-097094 A | 4/2006 |
| JP | 2006283130 | 10/2006 |
| JP | 2006283131 | 10/2006 |
| JP | 2008156734 | 7/2008 |
| JP | 2009-263752 A | 11/2009 |
| JP | 2010-053371 A | 3/2010 |
| JP | 201053446 | 3/2010 |
| JP | 2010-126758 A | 6/2010 |
| JP | 2010126757 | 6/2010 |
| JP | 2010255106 | 11/2010 |

(Continued)

OTHER PUBLICATIONS

Entire patent prosecution history of U.S. Appl. No. 13/821,637, filed Mar. 8, 2013, entitled, "High Strength Steel Sheet and Method for Manufacturing the Same."

(Continued)

*Primary Examiner* — Jessee Roe
*Assistant Examiner* — Jenny Wu
(74) *Attorney, Agent, or Firm* — RatnerPrestia

(57) ABSTRACT

The invention provides a high strength steel sheet which exhibits excellent chemical convertibility and corrosion resistance after electrodeposition coating even in the case where the steel sheet has a high Si content, and a method for manufacturing such steel sheets. The method includes continuous annealing of a steel sheet which includes, in terms of mass %, C at 0.01 to 0.18%, Si at 0.4 to 2.0%, Mn at 1.0 to 3.0%, Al at 0.001 to 1.0%, P at 0.005 to 0.060% and S at ≤0.01%, the balance being represented by Fe and inevitable impurities, while controlling the dew-point temperature of the atmosphere to become not more than −40° C. when the annealing furnace inside temperature is in the range of not less than 750° C.

4 Claims, 1 Drawing Sheet

(56) References Cited

FOREIGN PATENT DOCUMENTS

| JP | 5609494 | 10/2014 |
|---|---|---|
| KR | 1020090119264 | 11/2009 |
| WO | WO2007-043273 A1 | 4/2007 |
| WO | 2010061954 | 6/2010 |
| WO | 2012042676 | 4/2012 |
| WO | 2012043776 | 4/2012 |

OTHER PUBLICATIONS

Entire patent prosecution history of U.S. Appl. No. 13/822,153, filed May 21, 2013, entitled, "High Strength Steel Sheet and Method for Manufacturing the Same."

International Search Report dated Nov. 22, 2010, application No. PCT/JP2010/067612.

International Search Report for International Application No. PCT/JP2011/072491, mailed Jan. 17, 2012.

International Search Report dated Nov. 22, 2010, application No. PCT/JP2010/067611.

Final Office Action for U.S. Appl. No. 13/821,637 dated Jun. 24, 2015.

U.S. Office Action mailed Feb. 1, 2016 in U.S. Appl. No. 13/821,637.

U.S. Office Action mailed Sep. 10, 2015 in U.S. Appl. No. 13/822,153.

Final Office Action for U.S. Appl. No. 13/822,153, dated May 26, 2016.

Canadian Office Action dated Feb. 18, 2016 for Canadian Application No. 2,810,989.

Korean Office Action dated Jun. 27, 2016 for Korean Applicatio No. 2015-7030335, including Concise Statement of Relevance, 16 pages.

Extended European Search Report for EP Application No. 10857889.9, dated Oct. 20, 2016, 8 pages.

Notice of Allowance for U.S. Appl. No. 13/821,637, mailed Oct. 11, 2016, 33 pages.

* cited by examiner

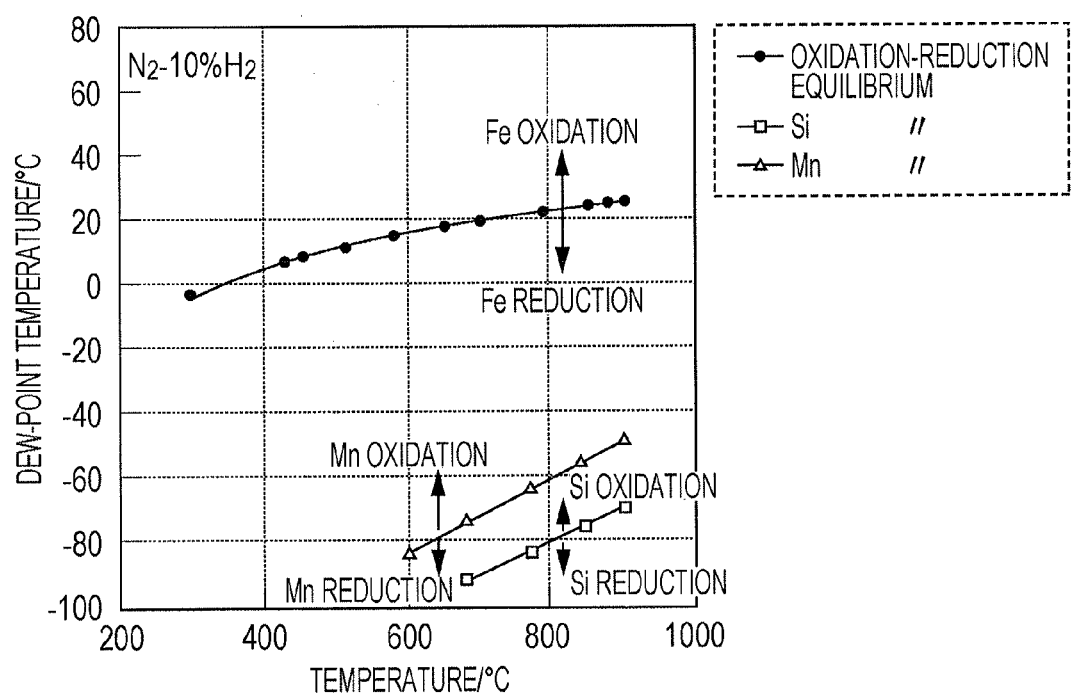

HIGH STRENGTH STEEL SHEET AND METHOD FOR MANUFACTURING THE SAME

CROSS REFERENCE TO RELATED APPLICATION

This application is the U.S. National Phase application of PCT International Application No. PCT/JP2010/067611, filed Sep. 30, 2010, the disclosure of which is incorporated herein by reference in its entirety for all purposes.

FIELD OF THE INVENTION

The present invention relates to a high strength steel sheet having excellent chemical convertibility and corrosion resistance after electrodeposition coating even in the case where the steel sheet has a high Si content, as well as to a method for manufacturing such steel sheets.

BACKGROUND OF THE INVENTION

From the viewpoint of the improvements in automobile fuel efficiency and crash safety of the automobiles, there have recently been increasing demands for car body materials to be increased in strength for thickness reduction in order to reduce the weight and increase the strength of car bodies themselves. For this purpose, the use of high strength steel sheets in automobiles has been promoted.

In general, automotive steel sheets are painted before use. As a pretreatment before painting, a chemical conversion treatment called phosphatization is performed. The chemical conversion treatment for steel sheets is one of the important treatments for ensuring corrosion resistance after painting.

The addition of silicon is effective for increasing the strength and the ductility of steel sheets. During continuous annealing, however, silicon is oxidized even if the annealing is performed in a reductive $N_2+H_2$ gas atmosphere which does not induce the oxidation of Fe (which reduces Fe oxides). As a result, a silicon oxide ($SiO_2$) is formed on the outermost surface of a steel sheet. This $SiO_2$ inhibits a reaction for forming a chemical conversion film during a chemical conversion treatment, thereby resulting in formation of a microscopical region where any chemical conversion film is not generated. (Hereinafter, such a region will be sometimes referred to as "non-covered region".) That is, chemical convertibility is lowered.

Among conventional techniques directed to the improvement of chemical convertibility of high-Si containing steel sheets, patent document 1 discloses a method in which an iron coating layer is electroplated at 20 to 1500 mg/m² onto a steel sheet. However, this method entails the provision of a separate electroplating facility and increases costs correspondingly to an increase in the number of steps.

Further, patent documents 2 and 3 provide an improvement in phosphatability by specifying the Mn/Si ratio and by adding nickel, respectively. However, the effects are dependent on the Si content in a steel sheet, and a further improvement will be necessary for steel sheets having a high Si content.

Patent document 4 discloses a method in which the dew-point temperature during annealing is controlled to be −25 to 0° C. so as to form an internal oxide layer which includes a Si-containing oxide within a depth of 1 μm from the surface of a steel sheet base as well as to control the proportion of the Si-containing oxide to be not more than 80% over a length of 10 μm of the surface of the steel sheet.

However, the method described in patent document 4 is predicated on the idea that the dew-point temperature is controlled with respect to the entire area inside a furnace. Thus, difficulties are encountered in controlling the dew-point temperature and ensuring stable operation. If annealing is performed while the controlling of the dew-point temperature is unstable, the distribution of internal oxides formed in a steel sheet becomes nonuniform to cause a risk that chemical convertibility may be variable in a longitudinal direction or a width direction of the steel sheet (non-covered regions may be formed in the entirety or a portion of the steel sheet). Even though an improvement in chemical convertibility is attained, a problem still remains in that corrosion resistance after electrodeposition coating is poor because of the presence of the Si-containing oxide immediately under the chemical conversion coating.

Further, patent document 5 describes a method in which the steel sheet temperature is brought to 350 to 650° C. in an oxidative atmosphere so as to form an oxide film on the surface of the steel sheet, and thereafter the steel sheet is heated to a recrystallization temperature in a reductive atmosphere and subsequently cooled. With this method, however, it is often the case that the thickness of the oxide film formed on the surface of the steel sheet is variable depending on the oxidation method and that the oxidation does not take place sufficiently or the oxide film becomes excessively thick with the result that the oxide film leaves residue or is exfoliated during the subsequent annealing in a reductive atmosphere, thus resulting in a deterioration in surface quality. In EXAMPLES, this patent document describes an embodiment in which oxidation is carried out in air. However, oxidation in air causes a problem such as giving a thick oxide which is hardly reduced in subsequent reduction or requiring a reductive atmosphere with a high hydrogen concentration.

Furthermore, patent document 6 describes a method in which a cold rolled steel sheet containing, in terms of mass %, Si at not less than 0.1% and/or Mn at not less than 1.0% is heated at a steel sheet temperature of not less than 400° C. in an iron-oxidizing atmosphere to form an oxide film on the surface of the steel sheet, and thereafter the oxide film on the surface of the steel sheet is reduced in an iron-reducing atmosphere. In detail, iron on the surface of the steel sheet is oxidized at not less than 400° C. using a direct flame burner with an air ratio of not less than 0.93 and not more than 1.10, and thereafter the steel sheet is annealed in a $N_2+H_2$ gas atmosphere which reduces the iron oxide, thereby forming an iron oxide layer on the outermost surface while suppressing the oxidation of $SiO_2$ which lowers chemical convertibility from occurring on the outermost surface. Patent document 6 does not specifically describe the heating temperature with the direct flame burner. However, in the case where Si is present at a high content (generally, 0.6% or more), the oxidation amount of silicon, which is more easily oxidized than iron, becomes large so as to suppress the oxidation of Fe or limit the oxidation of Fe itself to a too low level. As a result, the formation of a superficial reduced Fe layer by the reduction becomes insufficient and $SiO_2$ comes to be present on the surface of the steel sheet after the reduction, thus possibly resulting in a region which may not be covered with a chemical conversion film.

PATENT DOCUMENT

[Patent document 1] Japanese Unexamined Patent Application Publication No. 5-320952

[Patent document 2] Japanese Unexamined Patent Application Publication No. 2004-323969

[Patent document 3] Japanese Unexamined Patent Application Publication No. 6-10096

[Patent document 4] Japanese Unexamined Patent Application Publication No. 2003-113441

[Patent document 5] Japanese Unexamined Patent Application Publication No. 55-145122

[Patent document 6] Japanese Unexamined Patent Application Publication No. 2006-45615

SUMMARY OF THE INVENTION

The present invention has been made in view of the circumstances described above. This invention provides a high strength steel sheet which exhibits excellent chemical convertibility and corrosion resistance after electrodeposition coating even in the case of a high Si content, as well as to provide a method for manufacturing such steel sheets.

With respect to steel sheets containing easily oxidized elements such as Si and Mn, a conventional approach which has been actively adopted for the improvement of chemical convertibility is to oxidize the inner part of the steel sheets. However, this approach is accompanied by a deterioration in corrosion resistance after electrodeposition coating. Thus, the present inventors studied a novel, approach based on an unconventional idea capable of solving the above problems. As a result, the present inventors have found that the formation of an internal oxide in a surface portion of a steel sheet can be suppressed by appropriately controlling the atmosphere and the temperature during an annealing step, and thereby excellent chemical convertibility and higher corrosion resistance are obtained. In detail, a chemical conversion treatment is carried out after a steel sheet is annealed while controlling the dew-point temperature of the atmosphere to become not more than −40° C. when the annealing furnace inside temperature is in the range of not less than 750° C. By controlling the dew-point temperature of the atmosphere to become not more than −40° C. when the annealing furnace inside temperature is in the range of not less than 750° C., the oxygen potential at an interface between the steel sheet and the atmosphere is lowered to make it possible to suppress selective surface diffusion and oxidation of elements such as Si and Mn (hereinafter, referred to as surface segregation) while preventing the formation of internal oxides.

According to document 1 (7th International Conference on Zinc and Zinc Alloy Coated Steel Sheet Galvatech 2007, Proceedings p. 404), the oxygen potential is converted into a dew-point temperature based on thermodynamic data of oxidation reactions of Si and Mn. This document indicates that oxidation cannot be prevented unless the dew-point temperature is controlled to be less than −80° C. for Si and less than −60° C. for Mn at 800° C. in the presence of $N_2$–5% $H_2$. Thus, it has been considered that, even if the hydrogen concentration is increased, surface segregation cannot be prevented when a high strength steel sheet containing Si and Mn is annealed unless the dew-point temperature is controlled to be at least less than −80° C. Therefore, no attempts have been made in which a chemical conversion treatment is performed after annealing is carried out in an atmosphere having a dew-point temperature of −40 to −70° C.

FIG. 1 shows relationships of oxidation-reduction equilibriums of silicon and manganese versus dew-point temperature, which are calculated from thermodynamic data of Si and Mn oxidation reactions described in document 2 (Physical Chemistry of Metals, pp. 72-73, published on May 20, 1996 from The Japan Institute of Metals), as follows.

The oxidation-reduction equilibrium of silicon in a hydrogen-nitrogen atmosphere is expressed by the following equation.

$$SiO_2 \text{ (solid)} + 2H_2 \text{ (gas)} = Si + 2H_2O \text{ (gas)} \tag{1}$$

Assuming that the activity of silicon is 1, the equilibrium constant K for this reaction is as follows.

$$K = (H_2O \text{ partial pressure})^2/(H_2 \text{ partial pressure})^2 \tag{2}$$

The standard free energy ΔG (1) is represented by:

$$\Delta G(1) = -RT\ln K \tag{3}$$

where R is the gas constant and T is the temperature.

$$H_2 \text{ (gas)} + 1/2 O_2 \text{ (gas)} = H_2O \text{ (gas)} \tag{4}$$

$$Si \text{ (solid)} + O_2 \text{ (gas)} = SiO_2 \text{ (solid)} \tag{5}$$

Here, the standard free energies ΔG (4) and ΔG (5) in the above reaction formulae are expressed below as functions of T:

$$\Delta G(4) = -246000 + 54.8T$$

$$\Delta G(5) = -902100 + 174T$$

By calculating 2×(4)−(5), $$\Delta G(1) = 410100 - 64.4T \tag{6}$$

Because (3)=(6), $$K = \exp\{(1/R)(64.4 - 410100/T)\} \tag{7}$$

Based on (2)=(7) and the $H_2$ partial pressure=0.1 atm (in the case of 10%), the $H_2O$ partial pressure at each temperature T can be calculated. FIG. 1 is obtained by converting the partial pressure values into dew-point temperatures.

Similarly for manganese, the oxidation-reduction equilibrium of manganese in a hydrogen-nitrogen atmosphere is expressed by the following equation.

$$MnO \text{ (solid)} + H_2 \text{ (gas)} = Mn + H_2O \text{ (gas)} \tag{8}$$

The equilibrium constant K for this reaction is as follows.

$$K = (H_2O \text{ partial pressure})/(H_2 \text{ partial pressure}) \tag{9}$$

The standard free energy ΔG (8) is represented by:

$$\Delta G(8) = -RT\ln K \tag{10}$$

where R is the gas constant and T is the temperature.

$$H_2 \text{ (gas)} + 1/2 O_2 \text{ (gas)} = H_2O \text{ (gas)} \tag{11}$$

$$Mn \text{ (solid)} + 1/2 O_2 \text{ (gas)} = MnO \text{ (solid)} \tag{12}$$

Here, the standard free energies ΔG (11) and ΔG (12) in the above reaction formulae are expressed below as functions of T:

$$\Delta G(11) = -246000 + 54.8T$$

$$\Delta G(12) = -384700 + 72.8T$$

By calculating (11)−(12), $$\Delta G(8) = 138700 - 18.0T \tag{13}$$

Because (10)=(13), $$K = \exp\{(1/R)(18.0 - 138700/T)\} \tag{14}$$

Based on (9)=(14) and the $H_2$ partial pressure=0.1 atm (in the case of 10%), the $H_2O$ partial pressure at each temperature T can be calculated. FIG. 1 is obtained by converting the partial pressure values into dew-point temperatures.

From FIG. 1, silicon is in an oxidized state at a dew-point temperature of not less than −80° C. when the temperature is 800° C., which is a standard annealing temperature, and the dew-point temperature needs to be brought to less than −80° C. in order to make silicon in a reduced state. Similarly, it is understood that manganese is not reduced unless the dew-point temperature is brought to less than −60° C. These results are in good conformity with the results described in document 1.

During annealing, it is necessary that the temperature be increased from room temperature to 800° C. or above. The results shown in FIG. 1 and those described in document 1 indicate that the dew-point temperature for obtaining the reduced states of silicon and manganese becomes lower as the temperature decreases, and an extremely low dew-point temperature of less than −100° C. will be necessary when the temperature is increased from room temperature to 800° C. This strongly suggests that it will be impossible to realize an industrial annealing environment in which steel is heated to an annealing temperature while preventing the oxidation of silicon and manganese.

The foregoing is a technical common knowledge that can be easily drawn from thermodynamic data known to skilled persons in the art and is also a technical common knowledge which has impeded an attempt to perform annealing in an atmosphere with a dew-point temperature of −40 to −70° C. at which silicon and manganese are expected to be selectively oxidized. However, the present inventors have speculated that although surface oxidation, namely, surface segregation of silicon and manganese is expected to take place at a dew-point temperature in the range of −40 to −70° C. from the equilibrium point of view, there will be a possibility that in the case of a short heat treatment such as continuous annealing, this range of dew-point temperatures will not kinetically allow the surface segregation to proceed to such an extent that chemical convertibility is markedly deteriorated. The present inventors then dared to pursue the possibility and have completed the present invention having features described below.

The present invention according to exemplary embodiments is characterized in that a steel sheet is annealed while controlling the dew-point temperature of the atmosphere to become not more than −40° C. when the annealing furnace inside temperature is in the range of not less than 750° C.

The dew-point temperature of the annealing atmosphere for a steel sheet is usually −30° C. or above. Thus, water in the annealing atmosphere needs to be removed in order to control the dew-point temperature to be −40° C. or below. Enormous facility costs and operation costs are incurred in order to control the atmosphere in the entirety of an annealing furnace such that the dew-point temperature becomes −40° C. In contrast, according to exemplary embodiments, the present invention entails regulating the dew-point temperature to become not more than −40° C. only when the annealing furnace inside temperature is in a limited range of not less than 750° C., and thereby is characterized in allowing for the reduction of facility costs and operation costs. Such controlling with respect to a limited temperature range of not less than 750° C. is sufficient to achieve desired properties.

Further, higher chemical convertibility is obtained by performing a chemical conversion treatment after annealing is carried out while controlling the dew-point temperature of the atmosphere to become not more than −40° C. when the temperature is in the range of not less than 600° C. Still higher chemical convertibility is obtained by controlling the dew-point temperature of the atmosphere to become not more than −45° C. when the temperature is in the range of not less than 750° C. or in the range of not less than 600° C.

Such controlling of the dew-point temperature of the atmosphere with respect to the limited temperature range allows for manufacturing of high strength steel sheets with excellent chemical convertibility and corrosion resistance after electrodeposition coating, without the formation of internal oxides and while suppressing the occurrence of surface segregation to a minimum so as to prevent the occurrence of non-covered regions or uneven results of chemical conversion treatment. The term "excellent chemical convertibility" means that a steel sheet having undergone a chemical conversion treatment has an appearance without any non-covered regions or uneven results of the chemical conversion treatment.

In a high strength steel sheet obtained in the above manner, an oxide of one or more selected from Fe, Si, Mn, Al and P, as well as from B, Nb, Ti, Cr, Mo, Cu and Ni (except the case when Fe only is selected) has been suppressed from being formed in a surface portion of the steel sheet extending from the steel sheet surface within a depth of 100 μm, and the total amount of such oxides formed is limited to not more than 0.060 g/m$^2$ per single side surface. As a result, the steel sheet exhibits excellent chemical convertibility and is markedly improved in corrosion resistance after electrodeposition coating.

The present invention is based on the aforementioned findings. Features of the invention are as described below with reference to exemplary embodiments.

[1] A method for manufacturing high strength steel sheets, including continuous annealing of a steel sheet which includes, in terms of mass %, C at 0.01 to 0.18%, Si at 0.4 to 2.0%, Mn at 1.0 to 3.0%, Al at 0.001 to 1.0%, P at 0.005 to 0.060% and S at ≤0.01%, the balance being represented by Fe and inevitable impurities, while controlling the dew-point temperature of the atmosphere to become not more than −40° C. when the annealing furnace inside temperature is in the range of not less than 750° C.

[2] The method for manufacturing high strength steel sheets described in [1], wherein the chemical composition of the steel sheet further includes one or more elements selected from B at 0.001 to 0.005%, Nb at 0.005 to 0.05%, Ti at 0.005 to 0.05%, Cr at 0.001 to 1.0%, Mo at 0.05 to 1.0%, Cu at 0.05 to 1.0% and Ni at 0.05 to 1.0% in terms of mass %.

[3] The method for manufacturing high strength steel sheets described in [1] or [2], further including, after the continuous annealing, electrolytically pickling the steel sheet in an aqueous solution containing sulfuric acid.

[4] A high strength steel sheet which is manufactured by the method described in any of [1] to [3] and in which the amount of an oxide of one or more selected from Fe, Si, Mn, Al, P, B, Nb, Ti, Cr, Mo, Cu and Ni is not more than 0.060 g/m$^2$ per single side surface with respect to a surface portion of the steel sheet extending from the steel sheet surface within a depth of 100 μm.

In the present invention, the term "high strength" means that the tensile strength TS is not less than 340 MPa.

According to the present invention, a high strength steel sheet is obtained which exhibits excellent chemical convertibility and corrosion resistance after electrodeposition coating even in the case where the steel sheet has a high Si content.

BRIEF DESCRIPTION OF THE DRAWING

FIG. 1 shows oxidation-reduction equilibriums of silicon and manganese with respect to a dew-point temperature.

DETAILED DESCRIPTION OF EMBODIMENTS OF THE INVENTION

The present invention will be described in detail hereinbelow with reference to exemplary embodiments. In the following description, the unit for the contents of individual elements in the chemical composition of steel is "mass %" and is indicated simply as "%" unless otherwise mentioned.

First, there will be described annealing atmosphere conditions that are the most important requirement in the invention and determine the structure of the surface of the steel sheet.

In a high strength steel sheet to which large amounts of Si and Mn are added, internal oxidation of the surface of the steel sheet can be an origin of corrosion and therefore needs to be prevented as much as possible in order to achieve satisfactory corrosion resistance.

On the other hand, promoting the internal oxidation of Si and Mn can improve chemical convertibility. However, it also leads to a decrease in corrosion resistance. Thus, it is necessary that corrosion resistance be improved by suppressing internal oxidation while good chemical convertibility be ensured by an approach other than promoting the internal oxidation of Si and Mn. As a result of studies, the present invention provides that in order to ensure chemical convertibility, the oxygen potential is lowered in an annealing step and thereby the activities of easily oxidized elements such as Si and Mn in a surface portion of base steel are lowered. In this manner, the external oxidation of these elements is suppressed and consequently chemical convertibility is improved. Further, internal oxidation is also suppressed from occurring in the surface portion of the steel sheet with the result that corrosion resistance after electrodeposition coating is improved.

These effects are obtained by performing annealing in such a manner that the dew-point temperature of the atmosphere is controlled to become not more than −40° C. when the annealing furnace inside temperature is in the range of not less than 750° C. By controlling the dew-point temperature of the atmosphere to become not more than −40° C. when the annealing furnace inside temperature is in the range of not less than 750° C., the oxygen potential at an interface between the steel sheet and the atmosphere is lowered, whereby selective surface diffusion and surface segregation of elements such as Si and Mn are suppressed while preventing the formation of internal oxides. As a result, good chemical convertibility and corrosion resistance after electrodeposition coating are obtained while preventing the occurrence of non-covered regions or uneven results of a chemical conversion treatment.

The range of temperatures in which the dew-point temperature is controlled is limited to be not less than 750° C. for the following reasons. When the temperature is in the range of not less than 750° C., surface segregation and internal oxidation tend to proceed to such an extent that the occurrence of non-covered regions or uneven results of a chemical conversion treatment as well as the deterioration in corrosion resistance become problematic. Thus, the range of temperatures at which the advantageous effects of the invention are apparent is specified to be 750° C. and above. Surface segregation and internal oxidation can be suppressed more stably by controlling the dew-point temperature when the temperature is in the range of not less than 600° C.

The upper limit of the temperature range in which the dew-point temperature is controlled to become not more than −40° C. is not particularly limited. Controlling the atmosphere even after the temperature has exceeded 900° C. is not detrimental in achieving the inventive effects but is disadvantageous due to an increase in cost. Thus, the temperature range is preferably not more than 900° C.

The reasons why the dew-point temperature is controlled to become not more than −40° C. are as follows. The effects in suppressing surface segregation are seen when the dew-point temperature becomes not more than −40° C. The lower limit of the dew-point temperature is not particularly limited. However, the effects are saturated and cost disadvantages are encountered when the dew-point temperature is controlled to become below −70° C. Thus, the dew-point temperature is desirably not less than −70° C.

Next, the chemical composition of embodiments of the high strength steel sheets of interest according to the present invention will be described.

C: 0.01 to 0.18%

Carbon increases workability by forming phases such as martensite in the steel microstructure. In order to obtain this effect, carbon needs to be contained at not less than 0.01%. On the other hand, containing carbon in excess of 0.18% causes a decrease in elongation as well as deteriorations in quality and weldability. Thus, the C content is limited to be not less than 0.01% and not more than 0.18%.

Si: 0.4 to 2.0%

Silicon increases the strength and the elongation of steel and is therefore an effective element for achieving a good quality. In order to obtain the objective strength in the present invention, silicon is advantageously contained at not less than 0.4%. Steel sheets having a Si content of less than 0.4% cannot achieve a strength of interest in the invention and are substantially free of problems in terms of chemical convertibility. On the other hand, containing silicon in excess of 2.0% results in the saturation of steel strengthening effects as well as the saturation of elongation enhancement. Thus, the Si content is limited to be not less than 0.4% and not more than 2.0%.

Mn: 1.0 to 3.0%

Manganese is an effective element for increasing the strength of steel. In order to ensure mechanical characteristics and strength, the Mn content needs to be not less than 1.0%. On the other hand, containing manganese in excess of 3.0% causes difficulties in ensuring weldability and adhesion of the coating as well as in ensuring the balance between strength and ductility. Thus, the Mn content is limited to be not less than 1.0% and not more than 3.0%.

Al: 0.001 to 1.0%

Aluminum is added for the purpose of deoxidation of molten steel. This purpose is not fulfilled if the Al content is less than 0.001%. The deoxidation effect for molten steel is obtained by adding aluminum at not less than 0.001%. On the other hand, adding aluminum in excess of 1.0% increases costs and further results in an increase in the amount of surface segregation of aluminum, thereby making it difficult to improve chemical convertibility. Thus, the Al content is limited to be not less than 0.001% and not more than 1.0%.

P: 0.005 to Not More Than 0.060%

Phosphorus is one of elements that are inevitably present in steel. An increase in cost is expected if the P content is reduced to below 0.005%. Thus, the P content is specified to be not less than 0.005%. On the other hand, any P content exceeding 0.060% leads to a decrease in weldability and causes a marked deterioration in chemical convertibility to such an extent that it becomes difficult to improve chemical convertibility even by the present invention. Thus, the P content is limited to be not less than 0.005% and not more than 0.060%.

S: ≤0.01%

Sulfur is one of inevitable elements. The lower limit is not particularly limited. However, the presence of this element in a large amount causes decreases in weldability and corrosion resistance. Thus, the S content is limited to be not more than 0.01%.

In order to control the balance between strength and ductility, one or more elements selected from 0.001 to 0.005% of B, 0.005 to 0.05% of Nb, 0.005 to 0.05% of Ti, 0.001 to 1.0% of Cr, 0.05 to 1.0% of Mo, 0.05 to 1.0% of Cu and 0.05 to 1.0% of Ni may be added as required. The appropriate amounts of these optional elements are limited for the following reasons.

B: 0.001 to 0.005%

The effect in promoting hardening is hardly obtained if the B content is less than 0.001%. On the other hand, containing boron in excess of 0.005% results in a decrease in chemical convertibility. Thus, when boron is contained, the B content is limited to be not less than 0.001% and not more than 0.005%.

Nb: 0.005 to 0.05%

The effect in adjusting strength is hardly obtained if the Nb content is less than 0.005%. On the other hand, containing niobium in excess of 0.05% results in an increase in cost. Thus, when niobium is contained, the Nb content is limited to be not less than 0.005% and not more than 0.05%.

Ti: 0.005 to 0.05%

The effect in adjusting strength is hardly obtained if the Ti content is less than 0.005%. On the other hand, containing titanium in excess of 0.05% results in a decrease in chemical convertibility. Thus, when titanium is contained, the Ti content is limited to be not less than 0.005% and not more than 0.05%.

Cr: 0.001 to 1.0%

The hardening effect is hardly obtained if the Cr content is less than 0.001%. On the other hand, containing chromium in excess of 1.0% results in the surface segregation of chromium and a consequent decrease in weldability. Thus, when chromium is contained, the Cr content is limited to be not less than 0.001% and not more than 1.0%.

Mo: 0.05 to 1.0%

The effect in adjusting strength is hardly obtained if the Mo content is less than 0.05%. On the other hand, containing molybdenum in excess of 1.0% results in an increase in cost. Thus, when molybdenum is contained, the Mo content is limited to be not less than 0.05% and not more than 1.0%.

Cu: 0.05 to 1.0%

The effect in promoting the formation of a retained phase is hardly obtained if the Cu content is less than 0.05%. On the other hand, containing copper in excess of 1.0% results in an increase in cost. Thus, when copper is contained, the Cu content is limited to be not less than 0.05% and not more than 1.0%.

Ni: 0.05 to 1.0%

The effect in promoting the formation of a retained γ-phase is hardly obtained if the Ni content is less than 0.05%. On the other hand, containing nickel in excess of 1.0% results in an increase in cost. Thus, when nickel is contained, the Ni content is limited to be not less than 0.05% and not more than 1.0%.

The balance after the deduction of the aforementioned elements is represented by Fe and inevitable impurities.

Next, there will be described an embodiment of a method for manufacturing the high strength steel sheets according to the invention as well as the reasons why the conditions in the method are limited. In an embodiment, a steel having the above-described chemical composition is hot rolled and is thereafter cold rolled into a steel sheet, and subsequently the steel sheet is annealed in a continuous annealing facility. During the annealing in the present invention, the dew-point temperature of the atmosphere is preferably controlled to become not more than −40° C. when the annealing furnace inside temperature is in the range of not less than 750° C. This is the most important aspect of the invention. Further, surface segregation and internal oxidation described above can be suppressed more stably by controlling the dew-point temperature when the temperature is in the range of not less than 600° C. In the above processing of steel, there may be a case when the hot rolled steel sheet is annealed directly without being subjected to cold rolling.

Hot Rolling

Hot rolling may be performed under usual conditions.

Pickling

It is preferable to perform a pickling treatment after hot rolling. In the pickling step, black scales formed on the surface are removed and the steel sheet is subjected to cold rolling. Pickling conditions are not particularly limited.

Cold Rolling

Cold rolling is preferably carried out with a draft of not less than 40% and not more than 80%. If the draft is less than 40%, the recrystallization temperature becomes lower and the steel sheet tends to be deteriorated in mechanical characteristics. On the other hand, because the steel sheet of the invention is a high strength steel sheet, cold rolling the steel sheet with a draft exceeding 80% increases not only the rolling costs but also the amount of surface segregation during annealing, possibly resulting in a decrease in chemical convertibility.

The steel sheet that has been cold rolled or hot rolled is annealed and then subjected to a chemical conversion treatment.

In an annealing furnace, the steel sheet undergoes a heating step in which the steel sheet is heated to a predetermined temperature in an upstream heating zone and a soaking step in which the steel sheet is held in a downstream soaking zone at a predetermined temperature for a prescribed time.

Here, as described hereinabove, the steel sheet is annealed while controlling the dew-point temperature of the atmosphere to become not more than −40° C. when the annealing furnace inside temperature is in the range of not less than 750° C. The thus-annealed steel sheet is thereafter subjected to a chemical conversion treatment. Because the dew-point temperature of the atmosphere is usually higher than −40° C., the dew-point temperature is controlled to become not more than −40° C. by absorbing and removing water in the furnace with a dehumidifier or a water absorber.

The gas components in the annealing furnace include nitrogen, hydrogen and inevitable impurities. Other gas components may be present as long as they are not detrimental in achieving the advantageous effects of the invention. If the hydrogen concentration is less than 1 vol %, the activation effect by reduction cannot be obtained and chemical convertibility is deteriorated. Although the upper limit is not particularly limited, costs are increased and the effect is saturated if the hydrogen concentration exceeds 50 vol %. Thus, the hydrogen concentration is preferably not less than 1 vol % and not more than 50 vol %, and more desirably not less than 5 vol % and not more than 30 vol %.

After the steel sheet is cooled from the temperature range of not less than 750° C., hardening and tempering may be performed as required. Although the conditions for these treatments are not particularly limited, it is desirable that tempering be performed at a temperature of 150 to 400° C. The reasons are because elongation tends to be deteriorated if the temperature is less than 150° C. as well as because hardness tends to be decreased if the temperature is in excess of 400° C.

According to the present invention, good chemical convertibility can be ensured even without performing electrolytic pickling. However, it is preferable that electrolytic pickling be performed in order to remove trace amounts of oxides that have been inevitably generated by surface segregation during annealing and thereby to ensure better chemical convertibility.

The electrolytic pickling conditions are not particularly limited. However, in order to efficiently remove the inevitably formed surface segregation of silicon and manganese oxides formed during the annealing, alternating electrolysis at a current density of not less than 1 A/dm$^2$ is desirable. The reasons why alternating electrolysis is selected are because the pickling effects are low if the steel sheet is fixed to a cathode as well as because if the steel sheet is fixed to an anode, iron that is dissolved during electrolysis is accumulated in the pickling solution and the Fe concentration in the pickling solution is increased with the result that the attachment of iron to the surface of the steel sheet causes problems such as dry contamination.

The pickling solution used in the electrolytic pickling is not particularly limited. However, nitric acid or hydrofluoric acid is not preferable because they are highly corrosive to a facility and require careful handling. Hydrochloric acid is not preferable because chlorine gas can be generated from the cathode. In view of corrosiveness and environment, the use of sulfuric acid is preferable. The sulfuric acid concentration is preferably not less than 5 mass and not more than 20 mass %. If the sulfuric acid concentration is less than 5 mass %, the conductivity is so lowered that the bath voltage is raised during electrolysis possibly to increase the power load. On the other hand, any sulfuric acid concentration exceeding 20 mass % leads to a cost problem because a large loss is caused due to drag-out.

The temperature of the electrolytic solution is preferably not less than 40° C. and not more than 70° C. Maintaining the temperature below 40° C. is sometimes difficult because the bath temperature is raised by the generation of heat by continuous electrolysis. Further, a temperature exceeding 70° C. is not preferable in view of the durability of the lining of the electrolytic cell.

The high strength steel sheets of the present invention are obtained in the above manner.

As a result, the inventive steel sheet has a characteristic structure of the surface described below.

A surface portion of the steel sheet extending from the steel sheet surface within a depth of 100 μm has been suppressed from the formation of an oxide of one or more selected from Fe, Si, Mn, Al and P, as well as from B, Nb, Ti, Cr, Mo, Cu and Ni, and the total amount of such oxides formed is not more than 0.060 g/m$^2$ per single side surface.

In a high strength steel sheet to which large amounts of Si and Mn are added, internal oxidation of the surface of the steel sheet can be an origin of corrosion and therefore needs to be prevented as much as possible in order to achieve satisfactory corrosion resistance.

Thus, the present invention first provides that in order to ensure chemical convertibility, the oxygen potential in the annealing step is lowered and thereby the activities of easily oxidized elements such as Si and Mn in the surface portion are lowered. In this manner, the external oxidation of these elements is suppressed and consequently chemical convertibility is improved.

Further, internal oxidation is also suppressed from occurring in the surface portion with the result that corrosion resistance is improved. These effects become apparent by preventing the surface portion of the steel sheet which extends from the steel sheet surface within a depth of 100 1.1m from the formation of an oxide of at least one or more selected from Fe, Si, Mn, Al and P, as well as from B, Nb, Ti, Cr, Mo, Cu and Ni such that the total amount of such oxides formed is not more than 0.060 g/m$^2$. If the total amount of formed oxides (hereinafter, referred to as "internal oxidation amount") is in excess of 0.060 g/m$^2$, corrosion resistance is deteriorated. The effect in the improvement of corrosion resistance is saturated even when the internal oxidation amount is reduced to less than 0.0001 g/m$^2$. Thus, the lower limit of the internal oxidation amount is preferably 0.0001 g/m$^2$ or above.

EXAMPLE 1

Hereinbelow, aspects of the present invention will be described in detail based on EXAMPLES.

Hot rolled steel sheets with a steel composition described in Table 1 were pickled to remove black scales and were thereafter cold rolled to give cold rolled steel sheets with a thickness of 1.0 mm. Cold rolling was omitted for some of the steel sheets. That is, as-descaled hot rolled steel sheets (thickness: 2.0 mm) were also provided.

TABLE 1

| Steel code | C | Si | Mn | Al | P | S | Cr | Mo | B | Nb | Cu | Ni | Ti |
|---|---|---|---|---|---|---|---|---|---|---|---|---|---|
| A | 0.04 | 0.1 | 1.9 | 0.04 | 0.01 | 0.003 | — | — | — | — | — | — | — |
| B | 0.03 | 0.4 | 2.0 | 0.04 | 0.01 | 0.003 | — | — | — | — | — | — | — |
| C | 0.09 | 0.9 | 2.1 | 0.03 | 0.01 | 0.004 | — | — | — | — | — | — | — |
| D | 0.13 | 1.3 | 2.0 | 0.03 | 0.01 | 0.003 | — | — | — | — | — | — | — |
| E | 0.09 | 1.7 | 1.9 | 0.03 | 0.01 | 0.003 | — | — | — | — | — | — | — |
| F | 0.08 | 2.0 | 2.1 | 0.03 | 0.01 | 0.003 | — | — | — | — | — | — | — |
| G | 0.11 | 1.3 | 2.8 | 0.04 | 0.01 | 0.003 | — | — | — | — | — | — | — |
| H | 0.12 | 1.3 | 2.0 | 0.95 | 0.01 | 0.003 | — | — | — | — | — | — | — |
| I | 0.12 | 1.3 | 2.0 | 0.04 | 0.06 | 0.004 | — | — | — | — | — | — | — |
| J | 0.12 | 1.3 | 2.1 | 0.03 | 0.01 | 0.008 | — | — | — | — | — | — | — |
| K | 0.12 | 1.3 | 1.9 | 0.02 | 0.01 | 0.003 | 0.7 | — | — | — | — | — | — |
| L | 0.12 | 1.3 | 2.0 | 0.04 | 0.01 | 0.003 | — | 0.12 | — | — | — | — | — |

TABLE 1-continued

| Steel code | C | Si | Mn | Al | P | S | Cr | Mo | B | Nb | Cu | Ni | Ti |
|---|---|---|---|---|---|---|---|---|---|---|---|---|---|
| M | 0.12 | 1.3 | 2.1 | 0.03 | 0.01 | 0.003 | — | — | 0.005 | — | — | — | — |
| N | 0.12 | 1.3 | 2.0 | 0.05 | 0.01 | 0.003 | — | — | 0.001 | 0.04 | — | — | — |
| O | 0.12 | 1.3 | 1.9 | 0.03 | 0.01 | 0.004 | — | 0.11 | — | — | 0.2 | 0.3 | — |
| P | 0.12 | 1.3 | 1.9 | 0.04 | 0.01 | 0.003 | — | — | 0.003 | — | — | — | 0.03 |
| Q | 0.12 | 1.3 | 2.0 | 0.03 | 0.01 | 0.004 | — | — | — | — | — | — | 0.05 |
| R | <u>0.20</u> | 1.3 | 2.1 | 0.04 | 0.01 | 0.003 | — | — | — | — | — | — | — |
| S | 0.12 | <u>2.1</u> | 1.9 | 0.04 | 0.01 | 0.003 | — | — | — | — | — | — | — |
| T | 0.12 | 1.3 | <u>3.1</u> | 0.04 | 0.01 | 0.004 | — | — | — | — | — | — | — |
| U | 0.12 | 1.3 | 2.0 | <u>1.10</u> | 0.01 | 0.004 | — | — | — | — | — | — | — |
| V | 0.12 | 1.3 | 1.9 | 0.03 | <u>0.07</u> | 0.003 | — | — | — | — | — | — | — |
| W | 0.12 | 1.3 | 2.1 | 0.04 | 0.01 | <u>0.015</u> | — | — | — | — | — | — | — |

Underlines indicate "outside the inventive range".

Next, the cold rolled steel sheets and the hot rolled steel sheets obtained above were introduced into a continuous annealing facility. The steel sheet was annealed by passing through the annealing facility while controlling the dew-point temperature as described in Table 2 when the temperature inside the annealing furnace was in the range of not less than 750° C. The annealed steel sheet was thereafter subjected to water hardening and then to tempering at 300° C. for 140 seconds. Subsequently, electrolytic pickling was performed by alternating electrolysis in a 5 mass % aqueous sulfuric acid solution at 40° C. under current density conditions described in Table 2 while switching the polarity of the sample sheet between anodic and cathodic alternately each after 3 seconds. Thus, sample sheets were prepared. The dew-point temperature in the annealing furnace was basically set at −35° C. except when the dew-point temperature was controlled as described above. The gas components in the atmosphere included nitrogen gas, hydrogen gas and inevitable impurity gases. The dew-point temperature was controlled by dehumidifying the atmosphere or by removing water in the atmosphere by absorption. The hydrogen concentration in the atmosphere was basically set at 10 vol %.

With respect to the obtained sample sheets, TS and El were measured in accordance with a tensile testing method for metallic materials described in JIS Z 2241. Further, the sample sheets were tested to examine chemical convertibility and corrosion resistance. The amount of oxides present in a surface portion of the steel sheet extending immediately from the surface of the steel sheet to a depth of 100 μm (the internal oxidation amount) was measured. The measurement methods and the evaluation criteria are described below.

Chemical Convertibility

Chemical convertibility was evaluated by the following method.

A chemical conversion treatment liquid (PALBOND L3080 (registered trademark)) manufactured by Nihon Parkerizing Co., Ltd. was used. A chemical conversion treatment was carried out in the following manner.

The sample sheet was degreased with degreasing liquid FINE CLEANER (registered trademark) manufactured by Nihon Parkerizing Co., Ltd., and was thereafter washed with water. Subsequently, the surface of the sample sheet was conditioned for 30 seconds with surface conditioning liquid PREPAREN Z (registered trademark) manufactured by Nihon Parkerizing Co., Ltd. The sample sheet was then soaked in the chemical conversion treatment liquid (PALBOND L3080) at 43° C. for 120 seconds, washed with water and dried with hot air.

The sample sheet after the chemical conversion treatment was observed with a scanning electron microscope (SEM) at 500× magnification with respect to randomly selected five fields of view. The area ratio of the regions that had not been covered with the chemical conversion coating was measured by image processing. Chemical convertibility was evaluated based on the area ratio of the non-covered regions according to the following criteria. The symbol ○ indicates an acceptable level.

○: not more than 10%
×: more than 10%

Corrosion Resistance After Electrodeposition Coating

A 70 mm×150 mm test piece was cut out from the sample sheet that had been subjected to the above chemical conversion treatment. The test piece was cationically electrodeposition coated with PN-150G (registered trademark) manufactured by NIPPON PAINT Co., Ltd. (baking conditions: 170° C.×20 min, film thickness: 25 μm). Thereafter, the edges and the non-test surface were sealed with an Al tape, and the test surface was cut deep into the base steel with a cutter knife to create a cross cut pattern (cross angle: 60°), thereby preparing a sample.

Next, the sample was soaked in a 5 mass % aqueous NaCl solution (55° C.) for 240 hours, removed from the solution, washed with water and dried. Thereafter, an adhesive tape was applied to the cross cut pattern and was peeled therefrom. The exfoliation width was measured and was evaluated based on the following criteria. The symbol ○ indicates an acceptable level.

○: The exfoliation width from each cut line was less than 2.5 mm.
×: The exfoliation width from each cut line was 2.5 mm or more.

Workability

To evaluate workability, a JIS No. 5 tensile test piece was sampled from the sample sheet in a direction that was 90° relative to the rolling direction. The test piece was subjected to a tensile test at a constant cross head speed of 10 mm/min in accordance with JIS Z 2241, thereby determining the tensile strength (TS/MPa) and the elongation (El %). For steel sheets with TS of less than 650 MPa, workability was evaluated to be good when TS×El≥22000 and to be bad when TS×El<22000. For steel sheets with TS of 650 MPa to 900 MPa, workability was evaluated to be good when TS×El≥20000 and to be bad when TS×El<20000. For steel sheets with TS of not less than 900 MPa, workability was evaluated to be good when TS×El≥18000 and to be bad when TS×El<18000.

Internal Oxidation Amount in Region from Steel Sheet Surface to Depth of 100 μm

The internal oxidation amount was measured by an "impulse furnace fusion-infrared absorption method". It should be noted that the amount of oxygen present in the starting material (namely, the high strength steel sheet before annealing) should be subtracted. Thus, surface portions on both sides of the continuously annealed high strength steel sheet were polished by at least 100 μm and thereafter the oxygen concentration in the steel was measured. The measured value was obtained as the oxygen amount OH of the starting material. Further, the oxygen concentration was measured across the entirety of the continuously annealed high strength steel sheet in the sheet thickness direction. The measured value was obtained as the oxygen amount OI after internal oxidation. The difference between OI and OH (=OI−OH) was calculated wherein OI was the oxygen amount in the high strength steel sheet after internal oxidation and OH was the oxygen amount in the starting material. The difference was then converted to an amount per unit area (namely, 1 m$^2$) on one surface, thereby determining the internal oxidation amount (g/m$^2$).

The results and the manufacturing conditions are described in Table 2.

TABLE 2

| No. | Steel code | Si (mass %) | Mn (mass %) | Steel Cold rolled/Hot rolled | Annealing furnace Dew-point temp. (° C.) at below 750° C. | Dew-point temp. (° C.) at 750° C. or above | Maximum temp. (° C.) | Internal oxidation amount (g/m²) | Electrolytic pickling | Current density A/dm² | Chemical convertibility | Corrosion resistance after electrodeposition coating | TS MPa | El % | TS × El | Workability | Remarks |
|---|---|---|---|---|---|---|---|---|---|---|---|---|---|---|---|---|---|
| 1 | D | 1.3 | 2.0 | Cold rolled | −35 | −25 | 850 | 0.221 | Not performed | — | X | X | 1066 | 20.6 | 21960 | Good | COMP.EX. |
| 2 | D | 1.3 | 2.0 | Cold rolled | −35 | −35 | 850 | 0.143 | Not performed | — | X | X | 1031 | 20.0 | 20620 | Good | COMP.EX. |
| 3 | D | 1.3 | 2.0 | Cold rolled | −35 | −38 | 850 | 0.074 | Not performed | — | X | ○ | 1034 | 19.4 | 20060 | Good | COMP.EX. |
| 4 | D | 1.3 | 2.0 | Cold rolled | −35 | −40 | 850 | 0.056 | Not performed | — | ○ | ○ | 1020 | 20.1 | 20502 | Good | INV. EX. |
| 5 | D | 1.3 | 2.0 | Hot rolled | −35 | −47 | 850 | 0.042 | Not performed | — | ○ | ○ | 1033 | 20.6 | 21280 | Good | INV. EX. |
| 6 | D | 1.3 | 2.0 | Cold rolled | −35 | −47 | 850 | 0.009 | Not performed | — | ○ | ○ | 1035 | 20.1 | 20804 | Good | INV. EX. |
| 7 | D | 1.3 | 2.0 | Cold rolled | −35 | −52 | 850 | 0.005 | Not performed | — | ○ | ○ | 1029 | 20.1 | 20683 | Good | INV. EX. |
| 8 | D | 1.3 | 2.0 | Cold rolled | −35 | −60 | 850 | 0.005 | Not performed | — | ○ | ○ | 1022 | 19.9 | 20338 | Good | INV. EX. |
| 9 | D | 1.3 | 2.0 | Cold rolled | −35 | −47 | 780 | 0.010 | Not performed | — | ○ | ○ | 984 | 21.4 | 21058 | Good | INV. EX. |
| 10 | D | 1.3 | 2.0 | Cold rolled | −35 | −47 | 800 | 0.012 | Not performed | — | ○ | ○ | 993 | 20.9 | 20754 | Good | INV. EX. |
| 11 | D | 1.3 | 2.0 | Cold rolled | −35 | −47 | 890 | 0.025 | Not performed | — | ○ | ○ | 1162 | 17.9 | 20800 | Good | INV. EX. |
| 12 | D | 1.3 | 2.0 | Cold rolled | −35 | −47 | 850 | 0.013 | Performed | 1 | ○ | ○ | 1043 | 19.7 | 20547 | Good | INV. EX. |
| 13 | D | 1.3 | 2.0 | Cold rolled | −35 | −47 | 850 | 0.012 | Performed | 5 | ○ | ○ | 1034 | 19.9 | 20577 | Good | INV. EX. |
| 14 | D | 1.3 | 2.0 | Cold rolled | −35 | −47 | 850 | 0.012 | Performed | 10 | ○ | ○ | 1046 | 20.1 | 21025 | Good | INV. EX. |
| 15 | A | 0.1 | 1.9 | Cold rolled | −35 | −47 | 850 | 0.005 | Not performed | — | ○ | ○ | 723 | 26.4 | 19087 | Bad | COMP.EX. |
| 16 | B | 0.4 | 2.0 | Cold rolled | −35 | −47 | 850 | 0.009 | Not performed | — | ○ | ○ | 1008 | 21.1 | 21269 | Good | INV. EX. |
| 17 | C | 0.9 | 2.1 | Cold rolled | −35 | −47 | 850 | 0.011 | Not performed | — | ○ | ○ | 1023 | 22.0 | 22506 | Good | INV. EX. |
| 18 | E | 1.7 | 1.9 | Cold rolled | −35 | −47 | 850 | 0.030 | Not performed | — | ○ | ○ | 1035 | 22.5 | 23288 | Good | INV. EX. |
| 19 | F | 2.0 | 2.1 | Cold rolled | −35 | −47 | 850 | 0.039 | Not performed | — | ○ | ○ | 1031 | 19.6 | 20208 | Good | INV. EX. |
| 20 | G | 1.3 | 2.8 | Cold rolled | −35 | −47 | 850 | 0.021 | Not performed | — | ○ | ○ | 1066 | 19.9 | 21213 | Good | INV. EX. |
| 21 | H | 1.3 | 2.0 | Cold rolled | −35 | −47 | 850 | 0.051 | Not performed | — | ○ | ○ | 1061 | 20.8 | 22069 | Good | INV. EX. |
| 22 | I | 1.3 | 2.0 | Cold rolled | −35 | −47 | 850 | 0.022 | Not performed | — | ○ | ○ | 1144 | 20.7 | 23681 | Good | INV. EX. |
| 23 | J | 1.3 | 2.1 | Cold rolled | −35 | −47 | 850 | 0.015 | Not performed | — | ○ | ○ | 1040 | 20.4 | 21216 | Good | INV. EX. |
| 24 | K | 1.3 | 1.9 | Cold rolled | −35 | −47 | 850 | 0.016 | Not performed | — | ○ | ○ | 1061 | 19.7 | 20902 | Good | INV. EX. |
| 25 | L | 1.3 | 2.0 | Cold rolled | −35 | −47 | 850 | 0.013 | Not performed | — | ○ | ○ | 1051 | 19.0 | 19969 | Good | INV. EX. |
| 26 | M | 1.3 | 2.1 | Cold rolled | −35 | −47 | 850 | 0.014 | Not performed | — | ○ | ○ | 1033 | 21.1 | 21796 | Good | INV. EX. |
| 27 | N | 1.3 | 2.0 | Cold rolled | −35 | −47 | 850 | 0.016 | Not performed | — | ○ | ○ | 1074 | 20.4 | 21910 | Good | INV. EX. |
| 28 | O | 1.3 | 1.9 | Cold rolled | −35 | −47 | 850 | 0.015 | Not performed | — | ○ | ○ | 1077 | 20.6 | 22186 | Good | INV. EX. |
| 29 | P | 1.3 | 1.9 | Cold rolled | −35 | −47 | 850 | 0.013 | Not performed | — | ○ | ○ | 804 | 26.4 | 21226 | Good | INV. EX. |
| 30 | Q | 1.3 | 2.0 | Cold rolled | −35 | −47 | 850 | 0.017 | Not performed | — | ○ | ○ | 1053 | 20.1 | 21165 | Good | INV. EX. |
| 31 | R | 1.3 | 2.1 | Cold rolled | −35 | −47 | 850 | 0.019 | Not performed | — | ○ | ○ | 1264 | 13.8 | 17443 | Bad | COMP.EX. |
| 32 | S | 2.1 | 1.9 | Cold rolled | −35 | −47 | 850 | 0.052 | Not performed | — | X | ○ | 1200 | 16.5 | 19800 | Good | COMP.EX. |
| 33 | T | 1.3 | 3.1 | Cold rolled | −35 | −47 | 850 | 0.016 | Not performed | — | X | ○ | 1120 | 14.7 | 16464 | Bad | COMP.EX. |
| 34 | U | 1.3 | 2.0 | Cold rolled | −35 | −47 | 850 | 0.051 | Not performed | — | X | X | 1077 | 20.5 | 22079 | Good | COMP.EX. |
| 35 | V | 1.3 | 1.9 | Cold rolled | −35 | −47 | 850 | 0.033 | Not performed | — | X | ○ | 1138 | 18.6 | 21167 | Good | COMP.EX. |
| 36 | W | 1.3 | 2.1 | Cold rolled | −35 | −47 | 850 | 0.020 | Not performed | — | ○ | X | 1076 | 20.7 | 22273 | Good | COMP.EX. |

Underlines indicate that manufacturing conditions are outside the inventive ranges.

From Table 2, the high strength steel sheets manufactured by the inventive method were shown to be excellent in chemical convertibility, corrosion resistance after electrodeposition coating and workability in spite of the fact that these high strength steel sheets contained large amounts of easily oxidized elements such as Si and Mn.

On the other hand, the steel sheets obtained in COMPARATIVE EXAMPLES were poor in at least one of chemical convertibility, corrosion resistance after electrodeposition coating and workability.

The high strength steel sheets according to the present invention are excellent in chemical convertibility, corrosion resistance and workability, and can be used as surface-treated steel sheets for reducing the weight and increasing the strength of bodies of automobiles. Besides automobiles, the inventive high strength steel sheets can be used as surface-treated steel sheets having a corrosion resistance on the base steel sheet in a wide range of applications including home appliances and building materials.

The invention claimed is:

1. A method for manufacturing high strength steel sheets, comprising continuous annealing of a steel sheet which includes, in terms of mass %, C at 0.01 to 0.18%, Si at 0.4 to 2.0%, Mn at 1.0 to 3.0%, Al at 0.001 to 1.0%, P at 0.005 to 0.060% and S at ≤0.01%, the balance being represented by Fe and inevitable impurities, controlling the dew point of the annealing atmosphere with respect to an annealing furnace inside temperature including setting the dew point greater than −40° C. when the annealing furnace inside temperature is less than 750° C., and setting the dew point of the annealing atmosphere less than or equal to −40° C. when the annealing furnace inside temperature is greater than or equal to 750° C.

2. The method for manufacturing high strength steel sheets according to claim 1, wherein the chemical composition of the steel sheet further includes one or more elements selected from B at 0.001 to 0.005%, Nb at 0.005 to 0.05%, Ti at 0.005 to 0.05%, Cr at 0.001 to 1.0%, Mo at 0.05 to 1.0%, Cu at 0.05 to 1.0% and Ni at 0.05 to 1.0% in terms of mass %.

3. The method for manufacturing high strength steel sheets according to claim 1, further comprising, after the continuous annealing, electrolytically pickling the steel sheet in an aqueous solution containing sulfuric acid.

4. A high strength steel sheet which is manufactured by the method described in claim 1 and in which the amount of an oxide of one or more selected from Fe, Si, Mn, Al, P, B, Nb, Ti, Cr, Mo, Cu and Ni is not more than 0.060 g/m$^2$ per single side surface with respect to a surface portion of the steel sheet extending from the steel sheet surface within a depth of 100 μm.

* * * * *